April 1, 1924.
D. G. DUTY
1,488,742
AIR BRAKE FOR MOTOR VEHICLES
Filed April 17, 1923
2 Sheets-Sheet 2
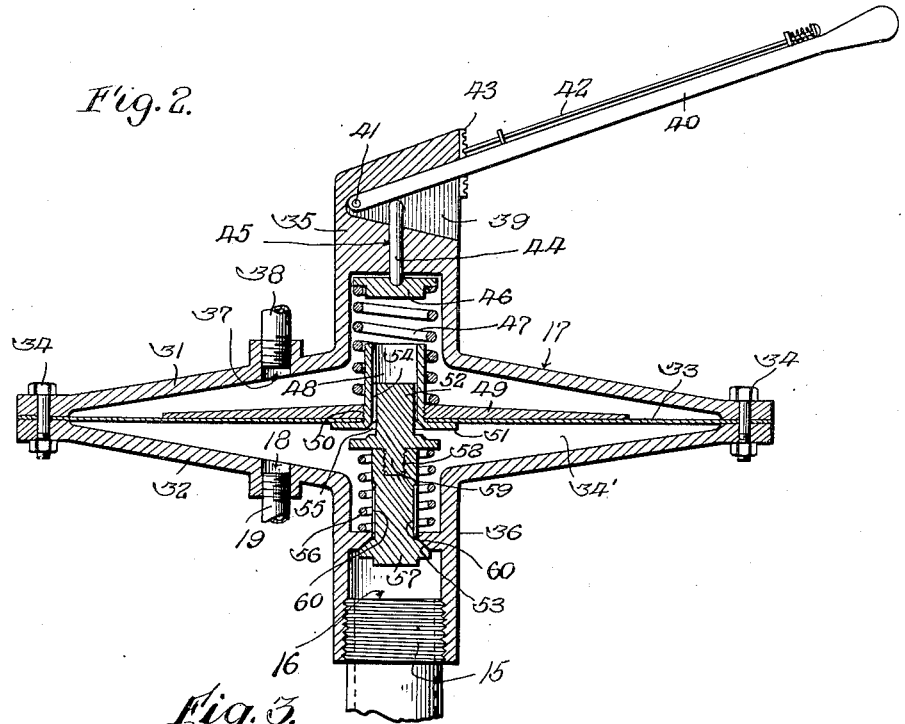
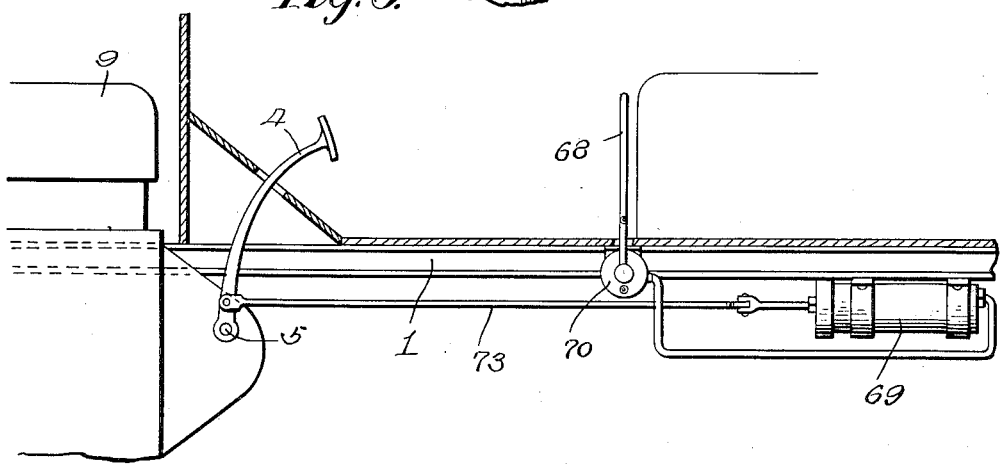
Inventor:
Dorsey G. Duty
By Percy H. Moore
Atty.

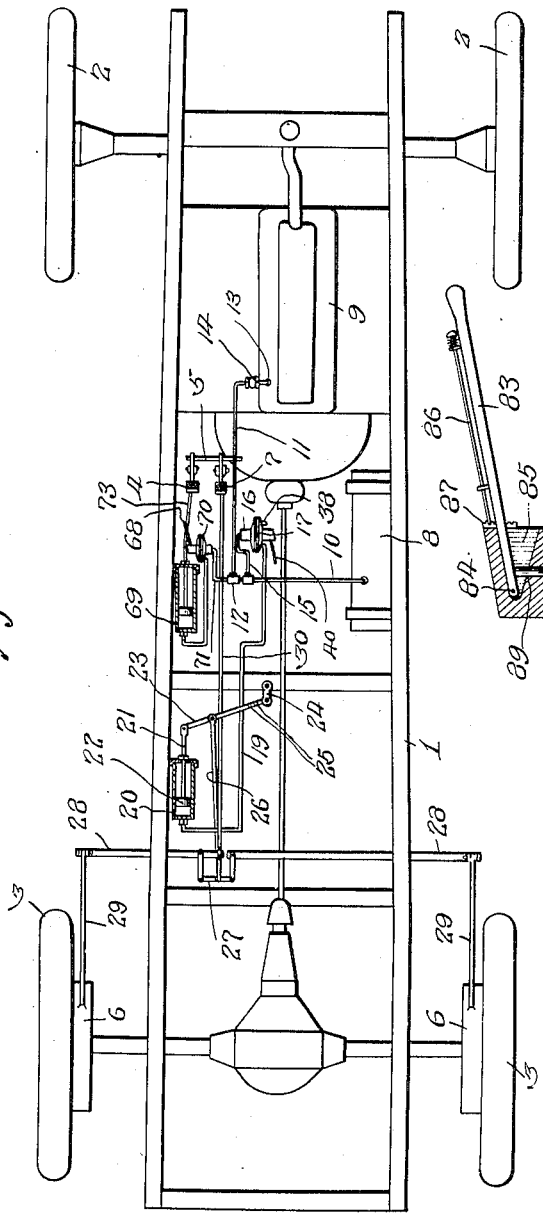

Patented Apr. 1, 1924.

1,488,742

UNITED STATES PATENT OFFICE.

DORSEY G. DUTY, OF PENNSBORO, WEST VIRGINIA.

AIR BRAKE FOR MOTOR VEHICLES.

Application filed April 17, 1923. Serial No. 632,667.

*To all whom it may concern:*

Be it known that DORSEY G. DUTY, a citizen of the United States of America, residing at Pennsboro, in the county of Ritchie and State of West Virginia, has invented certain new and useful Improvements in Air Brakes for Motor Vehicles, of which the following is a specification.

My invention relates to brakes for motor vehicles, and more particularly to air brakes for such vehicles.

One of the objects of the invention is to provide simple and easily actuated means for quickly releasing the clutch and applying the brakes without the use of the feet.

Another object of the invention is to provide means whereby the operator can with minimum effort gradually apply the brakes without interfering with the usual foot pedal mechanism.

Other objects and advantages will be in part described and in part obvious as the specification is proceeded with.

In the accompanying drawings forming part of the specification:

Figure 1 is a plan view of an automobile with my invention thereon;

Figure 2 is a horizontal section through the air control member;

Figure 3 is a partial side elevation of Figure 1; and

Figure 4 is horizontal section of a modified form of air control member.

Referring more particularly to the drawings, 1, denotes the frame of an automobile supported upon front and rear wheels 2 and 3 respectively. The clutch (not shown) is actuated in the usual way by means of foot pedal 4, fixedly mounted on the clutch shaft 5, while the brakes 6, on the rear wheels 3, are connected up with the foot pedal 7, loosely mounted on the shaft 5. The invention also contemplates the use of compressed air for actuating the brake mechanism and for throwing out the clutch independently of the foot pedals.

A compressed air tank 8, suitably mounted on the frame 1, is connected to the explosion chamber (not shown) of the engine 9, by means of a transverse pipe 10, leading from the tank and connected to one end of a longitudinally disposed pipe 11, by means of a T 12, the pipe 11, being connected at its other end to an elbow 13, in turn communicating with the explosion chamber. The elbow 13, is provided with a suitable check valve 14. When the engine is running compressed air will be constantly forced into the tank 8, in an obvious manner. Of course it is only necessary that the tank 8 be in communication with the explosion chamber of but one cylinder of the engine.

A short longitudinally disposed pipe 15, connects the pipe 10, with the inlet opening 16 of an air pressure control member 17, provided with an outlet 18, through which the compressed air passes into the pipe 19, and thence into one end of the brake control cylinder 20. The piston rod 21, of the piston 22, of the cylinder 20, is pivotally connected to a rock arm 23, which in turn is pivotally connected to the frame 1, by a link 24, the rod 23, being provided with a series of openings 25, whereby the point of connection with the link 24, may be adjusted to obtain the desired leverage. A rod 26 is connected at its forward end to the rod 23, intermediate the ends of the latter and at its rear end is connected to the crank arm 27, of the usual brake rods 28 and 29 of the brake 6.

It will thus be seen that forward movement of the rod 26, rocks the crank arm 27, and the rods 28, in a clockwise direction, thus pulling the rods 29, forwardly and causing the brakes 6, to tighten.

This movement of the rod 26, and consequent application of the brake can be effected through the manipulation of the brake foot pedal 7, and the rod 30, which connects the pedal 7, with the crank 27, or this may be accomplished by admitting compressed air into the cylinder 20, in a manner hereinafter explained.

The pressure control member 17, comprises two oppositely bowed castings 31 and 32 between the superposed edges of which is clamped a diaphragm 33 separating the air chamber 34' into upper and lower air tight compartments, by means of bolts 34. The castings 31 and 32 which form therebetween the air chamber 34', are provided with the oppositely disposed cylindrical portions or projections 35 and 36 respectively and the casting 31, is formed with an exhaust opening 37, connected with an exhaust pipe 38, the opening 37, being opposite the outlet opening 18, in the casting 32, previously described as leading to the brake control cylinder 20.

The cylindrical portion or projection 35 of the casting 31, is formed with an opening or recess 39, within which the inner end of the hand lever 40, is pivotally mounted as at 41, a pawl 42, on the lever 40, and a rack 43, on the projection 35, serving to lock the lever in adjusted position. A pin 44, slidably disposed in a vertical opening 45, in the projection 35, is connected to a plunger 46, at its lower end, and its upper end is resiliently held against the lever 40, by the action of coil spring 47. This spring 47, encircles the upper end of a flanged tubular valve seat member 48, projecting up through central aligned openings in the diaphragm 33, and a plate 49, respectively, the said plate being superposed on the diaphragm. The tubular member 48, and the plate 49, are threadedly connected together as at 50, the diaphragm 33, being clamped between the plate 49, and the flanges 51, of the tubular member 48, when the parts are screwed up as illustrated in Figure 2.

A cylindrical valve 52, having its upper portion provided with longitudinal grooves 54, projecting into the tubular valve seat member 48, is adapted to be resiliently held in Figure 2 position and normally below the valve seat 55, by means of a coil spring 56. The spring 56, bears at opposite ends against the valve 52 and against a valve seat 53, in the projection 36, of the casting 32.

A second or lower valve 57, similar to the valve 52, is formed with a threaded recess in its upper end into which is threaded as at 58, the threaded projection 59, on the upper valve 52. Consequently the coil spring 56, also serves to normally hold the valve 57, closed against its seat 53.

The operation of the brakes by compressed air is accomplished in the following manner:

The operator presses down on the lever 40 thereby compressing the spring 47, and in turn forcing the diaphragm downwardly until the valve seat 55, engages the valve 52. Continued downward movement of the lever 40 forces the valve 57 from its seat 53, whereupon compressed air direct from the explosion chamber of the engine enters inlet opening 16, and passes upwardly through the grooves 60, into the lower part of the chamber 34', and thence out through pipe 19 to cylinder 20, thus causing the brakes to be applied.

It may here be noted that the air pressure can be gradually applied with little effort on the part of the operator, it merely being necessary for the latter to slowly push the lever 40, to the limit of its movement to obtain the maximum air pressure. The brakes will thus be gradually and smoothly applied, with little increased effort on the part of the operator as the tension on spring 56, increases toward the end of the movement of the knee lever. This movement of the lever also seats the valve 52, and prevents air escaping through the blow off outlet 37, leading from the air pressure control member 17.

The clutch (not shown) can be operated either by the foot pedal 4, or by means of compressed air as follows: A clutch lever 68, clutch cylinder 69, and pressure control member 70 are provided, identical with the brake lever 40, brake cylinder 20, and brake pressure control member 17, respectively, the only difference being that the position of the member 70, is just the reverse of that of the member 17. When the operator pushes the lever 68 downwardly the air control mechanism is operated in the identical manner described in connection with the operation of the brakes. The pipe 10, leading from the air tank 8, connects up with the inlet opening 16, of the member 70, in the same manner as the branch pipe 15, connects with the air pressure control member 17. A pipe 71, connects the outlet opening 18, of the member 70, with the clutch operating cylinder 69. Consequently when the lever 68, is actuated the piston of cylinder 69, will be moved forwardly and the clutch shaft 5, will be rocked through the medium of the rod 73, which connects the shaft 5, with the piston of the cylinder 62, thereby throwing out the clutch (not shown).

The air pressure control members 17 and 70 are identical and therefore it is deemed unnecessary to describe the structure and operation of both in detail It will be noted that the air pressure control members receive the air from a common source and that the one can be used without the other, or both can be used at the same time, also that one or both of the foot pedals can be used independently of either of the air controls or simultaneously therewith.

In order to remove the pressure from the brakes the lever 40, is released, whereupon the compressed air entering inlet opening 16, elevates the diaphragm to its normal horizontal positions thus unseating the valve 52. The valve 57 immediately closes and the upper and lower portions of the chamber 34, being in communication with each other through the grooves 54, in valve 52, the pressure becomes equal on both sides of the diaphragm as the compressed air in the chamber 34, escapes through the exhaust pipe 38. It is to be understood that it is essential that the pipes 19 and 38 be of the same size and that inlet 16, be considerably larger than pipes 19 and 38.

In Figure 4 I have illustrated a modified pressure control member comprising a cylinder 80 having a cover 81 provided with an upstanding tubular projection 82. A hand lever 83 is pivotally mounted at one end as at 84, in a recess 85, a pawl 86 on the lever being adapted to engage a rack 87, on the projection 82, to hold the lever in adjusted position. A pin 88, slidably disposed in a vertical opening 89, in the projection 82, is connected to a plunger 90, at its lower end, and at its upper ends is resiliently held against the lever 83, by the action of coil spring 91. This spring 91, rests against the upper end of a flanged tubular member 92, which in turn rests upon the top of a piston 93, there being a reinforcing plate 94, on the under side of the piston, the piston being clamped between this plate and the flanges 95 by any suitable fastening means (not shown).

A cylindrical valve 96, having its upper portion provided with longitudinal grooves 97, projects up through the plate 94, and piston 93 and extends into the flanged tubular member 92. A second or lower valve 98, similar to the valve 96, is formed with a threaded recess in its upper end into which is threaded as at 99, the threaded projection 100, on the upper valve 96. This lower valve 98, which is formed with longitudinal grooves 101 is resiliently held against the valve seat 102, in the inlet opening 103, connected to the explosion chamber of the engine, by means of a coil spring 104, bearing at its upper end against the flange 105, of valve 96, and at its lower end against the lower end of the cylinder 80.

The opening 106, in the cylinder beneath the piston 93, leads via pipe 19, to the piston 20, and the exhaust opening 107 connects with exhaust pipe 38 as in the preferred form of my invention.

As the operation of the modification is substantially the same as that of the preferred form, further explanation is deemed unnecessary.

Having thus described my invention what I claim as my invention is:

In combination a motor vehicle having wheels and brakes therefor, a brake cylinder and piston for actuating the brakes by compressed air, an air supply in communication with the explosion chamber of the engine and with said brake cylinder, and pressure control means for gradually feeding the compressed air to the brake actuating means, said pressure control means comprising an air chamber, a displaceable member in said chamber dividing the same into upper and lower air tight compartments, an inlet opening for connecting said lower compartment with the explosive chamber of the engine, a spring pressed lower valve normally closing said opening, said displacement member having an opening normally communicating with said upper and lower compartments, an upper valve connected to said first mentioned valve for closing said opening in said displaceable member, means for forcing said displaceable member downwardly against said second valve to close the opening in said displaceable member, said upper compartment having an exhaust outlet of smaller size than said air inlet opening, and said lower compartment having an outlet identical in size to said exhaust outlet leading to said brake cylinder, and means for forcing said displaceable member against said second valve to cause said upper valve to close and said lower valve to open.

In testimony whereof I affix my signature in presence of two witnesses.

DORSEY G. DUTY.

Witnesses:
H. V. ADAMS,
I. L. FORDYCE.